(12) United States Patent
Kuelbs et al.

(10) Patent No.: US 7,204,618 B1
(45) Date of Patent: Apr. 17, 2007

(54) LIGHT WITH INTERCHANGEABLE PANELS

(75) Inventors: Gregory G. Kuelbs, Westlake, TX (US); Gustav P. Kuelbs, Grapevine, TX (US); Scott A. Plasek, Irving, TX (US); Chad H. Jones, Frisco, TX (US)

(73) Assignee: World Factory, Inc. DE (US)

( * ) Notice: Subject to any disclaimer, the term of this patent is extended or adjusted under 35 U.S.C. 154(b) by 0 days.

(21) Appl. No.: 11/201,509

(22) Filed: Aug. 11, 2005

Related U.S. Application Data

(60) Provisional application No. 60/601,372, filed on Aug. 13, 2004.

(51) Int. Cl.
*F21V 14/08* (2006.01)
*F21V 15/00* (2006.01)

(52) U.S. Cl. .................. 362/367; 362/375; 362/35

(58) Field of Classification Search ............... 362/367, 362/374, 375, 456, 35
See application file for complete search history.

(56) References Cited

U.S. PATENT DOCUMENTS

| | | | | |
|---|---|---|---|---|
| 4,453,327 A | * | 6/1984 | Clarke | 40/562 |
| 5,598,652 A | * | 2/1997 | Nurre | 40/553 |
| 6,305,826 B1 | * | 10/2001 | Yang | 362/351 |
| 6,629,766 B2 | * | 10/2003 | Cathel | 362/183 |
| 6,729,742 B2 | | 5/2004 | Wismeth et al. | 362/183 |

* cited by examiner

*Primary Examiner*—Laura K. Tso
(74) *Attorney, Agent, or Firm*—James E. Walton

(57) ABSTRACT

A light assembly has at least one pane having at least one translucent portion and at least one insert having at least one translucent portion. A retaining means retains the at least one insert relative to the at least one pane, and at least one electrically powered light source emits light that passes through the translucent portions of the at least one pane and of the at least one insert. A rechargeable electrical power source provides electrical power to the light source, and a solar-energy system recharges the electrical power source.

16 Claims, 5 Drawing Sheets

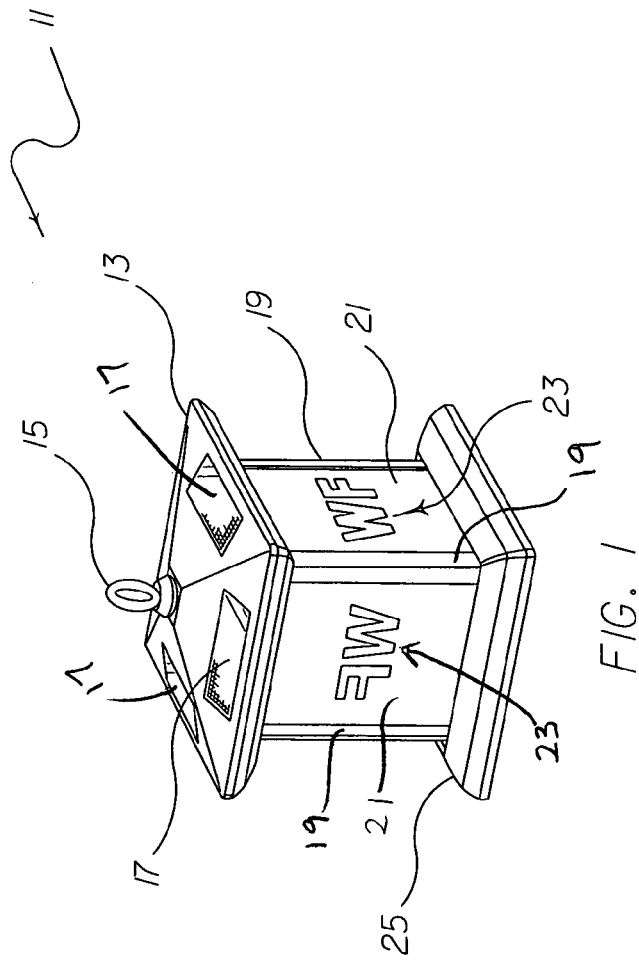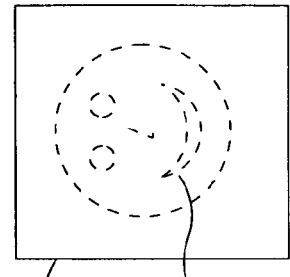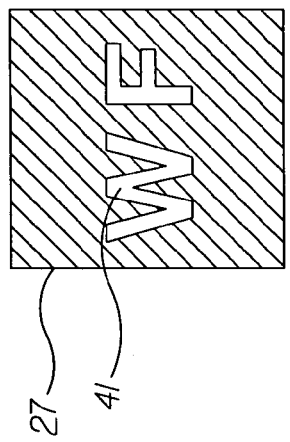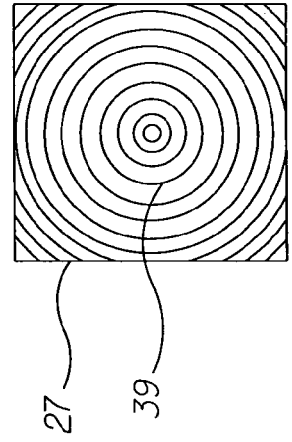

LIGHT WITH INTERCHANGEABLE PANELS

This application claims the benefit of U.S. Provisional Application No. 60/601,372, filed 13 Aug. 2004, titled "Light with Interchangeable Panels".

BACKGROUND OF THE INVENTION

1. Field of the Invention

The present invention relates in general to the field of lights, specifically to lights having interchangeable panes and panels.

2. Description of Related Art

Lights with decorative lenses, shades, or other decorative panels are well known in the art. Due to the popularity of interior and exterior decorating, these lights can be found in homes and businesses alike. These lights and light housings may provide illumination and may be viewed as decorative elements.

Known in the prior art are solar lamps for outdoor use, in particular garden lamps, consisting of one or more solar modules and a housing with a storage means for electric energy (battery) produced by the solar module. The battery is conductively connected to the solar module and to one or more luminous bodies, whereby between the battery and the luminous body a circuit is provided which reacts to signals from a light sensor attached to the solar lamp and enables or disables the electrical connection between the battery and the luminous body, depending on the degree of ambient brightness.

U.S. Pat. No. 6,729,742, issued to Wismeth, et. al., discloses a solar light for outdoor use. Like other products, the problem with this light is that it does not offer the user an easy way to vary the decorative or functional nature of the light after purchase or installation.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which:

FIG. 1 is a perspective view of a light according to the present invention;

FIGS. 3A through 3C are front views of inserts for use in the light of FIG. 1;

DETAILED DESCRIPTION OF THE PREFERRED EMBODIMENT

Figure 2:
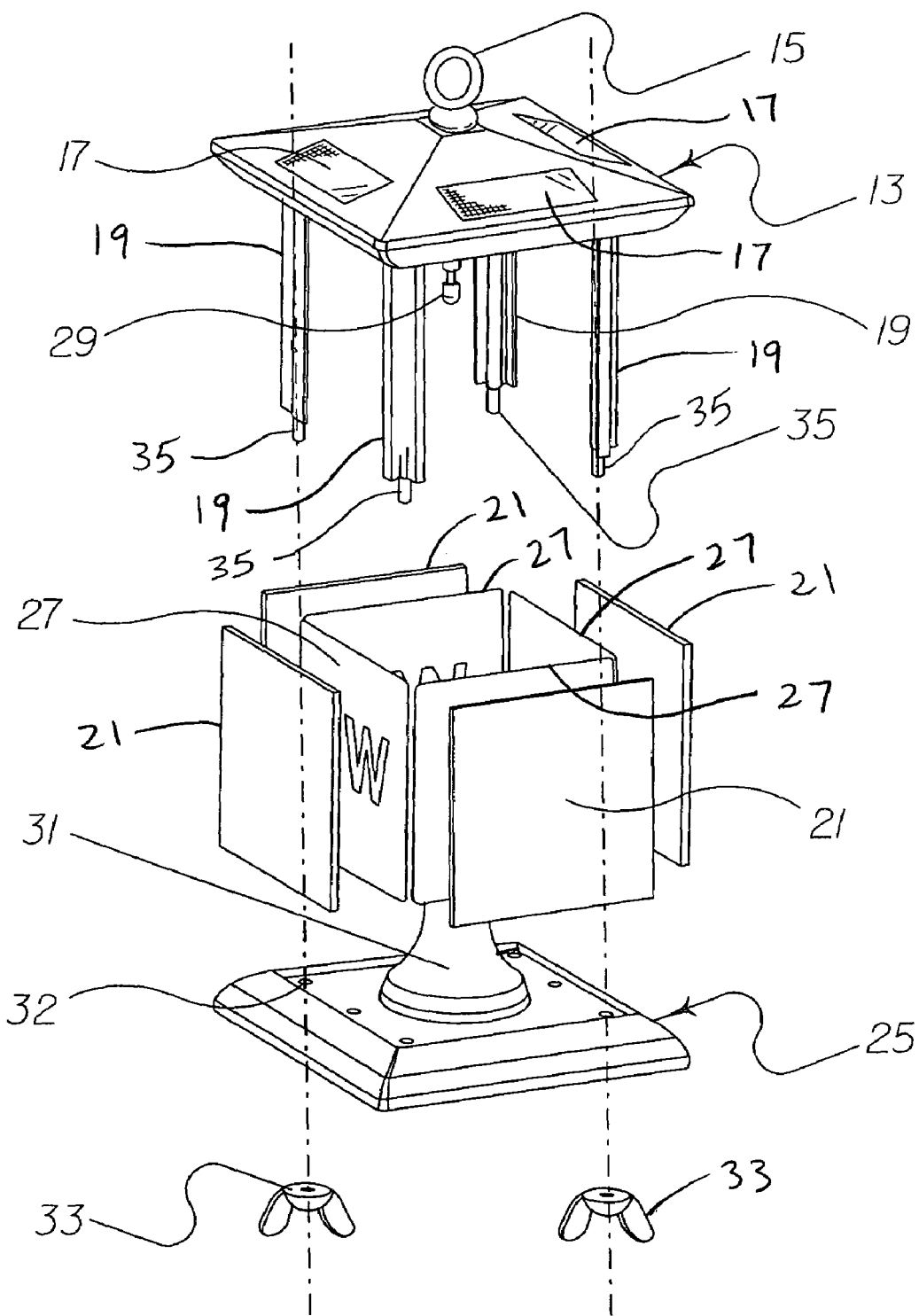
FIG. 2 is an exploded, perspective view of the light of FIG. 1.

Referring now to FIG. 1 in the drawings, the preferred embodiment of a light 11 with removable panels according to the present invention is illustrated. Light 11 includes a top 13, vertical retainers 19, panes 21 located between retainers 19, and a base 25. Top 13 is removably connected to retainers 19, and retainers are removably connected to base 25. Panes 21 are preferably removably carried between pairs of retainers 19 on each side of light 11, allowing the user to view one or more designs 23, which may optionally be a feature formed as part of one or more panes 21.

Top 13 is preferably made of a metal but may alternatively be made of other materials, such as plastic or wood, that provide adequate rigidity for top 13 to retain its shape during use of light 11. While top 13 is shown to have four sides in the preferred embodiment, top 13 could alternatively be shaped as a circle or any other shape as viewed from above or its sides.

Attached to top 13 is a hanger 15, which is used to hang or hold light 11 from above. Hanger 15 is preferably made of metal but may alternatively be made of any material that provides adequate rigidity for hanger 15 to bear the weight of light 11 as light 11 is held or secured from above at hanger 15. Hanger 15 may alternatively be a nonfunctional decorative element of light 11. Hanger 15 is shown in the preferred embodiment as being shaped like an eyelet, but hanger 15 could alternatively be shaped as an open hook, a rod-like protrusion, or any other shape adequate for securing or holding light 11 from above. Also, though hanger 15 is shown as being located in the center of top 13 as viewed from above, hanger 15 may alternatively be attached to top 13 at any other singular or plurality of locations on top 13.

One or more optional solar cells 17 are also attached to top 13 and form part of a solar-energy system conductively coupled to electrical devices of light 11. In the embodiment shown, solar cells 17 are used to convert light into electrical energy suitable for consumption by light emitting devices. In other embodiments, solar cells 17 may provide energy for additional or alternative uses such as charging a battery, powering an audio system, warming light 11 to prevent condensation build up, and/or various other possible uses. It should also be noted that the placement of solar cells 17 may be appropriate at any number of other exterior or interior locations on or about light 11 where solar cells 17 can receive ambient light. In other embodiments, light 11 may be powered by an optional replaceable electrical source, such as a disposable battery.

Retainers 19 are preferably made of metal, though plastic, wood, or any other sufficiently rigid material may be used. Panes 21 are preferably made of clear uncolored glass. However, panes 21 can alternatively be made of wood, glass, plastic, metal or any other material that can be properly shaped and formed to allow, block, or otherwise alter the transfer of illumination from inside light 11. Though shown as rectangular, panes 21 may be formed to have any planar or non-planar shape, including concave or convex panes, globes, or other desired configurations. In the preferred embodiment, clear uncolored glass is implemented as the material of choice for panes 21 to better allow the user to view design 23.

Base 25 is preferably made of a metal but may alternatively be made of other materials, such as plastic or wood, that provides adequate rigidity for base 25 to retain its shape during use of light 11. While base 25 is shown to have four sides in the preferred embodiment, base 25 could alternatively be shaped as a circle or any other shape as viewed from above or its sides.

FIG. 2 depicts light 11 in a partially exploded or disassembled state. In addition to the elements described for FIG. 1, FIG. 2 further illustrates illuminator 29 removably connected to top 13, one or more inserts 27 to be placed between retainers 19, and one or more posts 35 as features of retainers 19. A reflector 31 is carried on base 25, and holes 32 in base 25 receive threaded ends of posts 35. Threaded fasteners 33 engage the ends of posts 35 for securing base 25 to retainers 19. Alternatively, base may be retained by other means, such as clips, snap fasteners, or sliding engagements means that are engaged or disengaged by rotating base 25 relative to retainers 19. FIG. 2 depicts how the preferred embodiment of light 11 is easily assembled and disassembled allowing the user to change panes 21 and inserts 27.

Light 11 provides illumination through the use of illuminator 29. In the preferred embodiment illuminator 29 is a light-emitting diode (LED) which emits light in a directional manner downward toward reflector 31. Reflector 31 reflects the emitted light out of light 11 to increase the ambient illumination provided by light 11. Although the preferred embodiment implements a LED for illuminator 29, other light sources could be used, including incandescent bulbs, fluorescent bulbs, organic LEDs, or cold cathode-ray tubes. Alternative embodiments may allow placement of light-emitting devices or other energy consuming devices within, on, or about light 11. Reflector 31 is preferably made of plastic, though other materials having light reflective or light transmission capability may be used, such as metal or glass.

The preferred embodiment of light 11 provides for one pane 21 and an associated insert 27 to be placed between a pair of retainers 19, the panes 21 and inserts 27 being capable of working in combination or independently to produce the desired functional or decorative effect. Inserts 19 are preferably made of acetone treatments and provide graphics viewed through pane 21. Alternatively, inserts 27 could be made of metal, plastic, glass, or any other material that can be properly sized to allow retention by retainers 19. Also, inserts 27 can be printed in any combination of colors, and decorative or functional designs 23 (see FIG. 1) can be formed in inserts 27 by stamping, printing, embossing, custom cutting by the user, or by any other means of producing a desired design 23. Inserts 27 may also be thin films, or thin films (not shown) may be used in addition to inserts 27. For example, a user may install inserts 27 together with a thin, colored film, providing a method for easily changing the color without changing inserts 27.

While inserts 27 are shown to have a particular textual design 23, inserts may have one or more of many types of designs 23. Referring now to FIGS. 3A through 3C, three examples of embodiments of inserts 27 are illustrated. FIG. 3A shows insert 27 formed into a lens having concentric ridges 39 where insert 27 has a greater or lesser thickness. This variance in thickness may be used to transmit illumination from light 11 in a manner that is functionally or decoratively different than transmitting light through insert 27 with a consistent thickness. FIG. 3A also depicts one of any number of graphic designs an insert 27 could carry. FIG. 3B shows an insert 27 having a graphic 41 that includes text formed by cutting or punching alphanumeric shapes or other designs out of the material used to form inserts 27 or by providing translucent portions that form graphic 41. Alternatively, FIG. 3C shows that inserts 27 may carry one or more perforations 43 which allow light to pass through in a different manner than the non-perforated portion of inserts 27. Perforations allow the user or manufacturer of insert 27 to alter the decorative and functional nature of insert 27.

Figure 4:
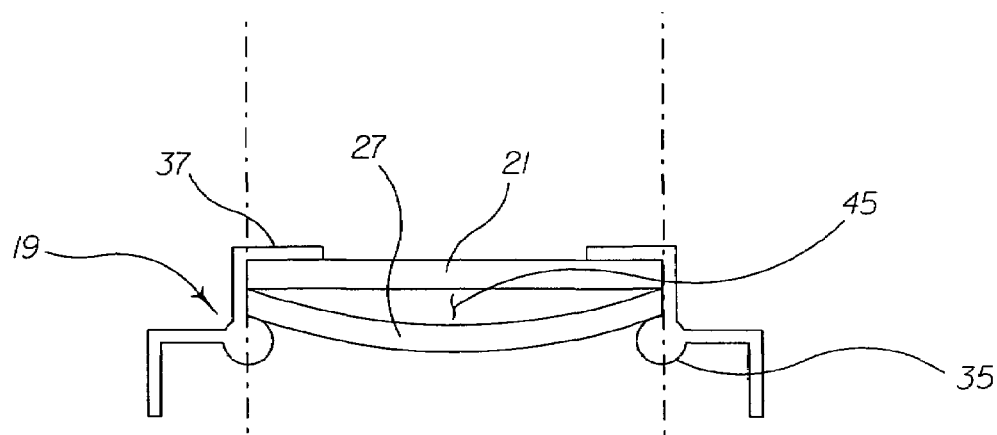
FIG. 4 is a plan view of a portion of the light of FIG. 1 and shows the preferred method of installation of inserts of the invention.

FIG. 4 shows the preferred relation of a pane 21 and an insert 27 to a pair of retainers 19 and better illustrates how panes 21 and inserts 27 are retained by retainers 19. Retainers 19 comprise one or more posts 35 and one or more arms 37, and properly sized and shaped panes 21 are preferably held by fitting securely between arms 37 of a pair of retainers 19. Inserts 27 are slightly wider than panes 21, and inserts 27 flex and bow inward when installed, creating a small space 45 between each pane 21 and corresponding insert 27. This maintains pressure on opposing arms 37 near posts 35, retaining inserts 27 between arms 37, but allowing a user to easily remove and replace inserts 27 by sliding inserts 27 in a direction parallel to the length of posts 35 or by further flexing inserts 27 to clear one or both posts 35. In the preferred embodiment, inserts 27 are located on the interior side of panes 21, though inserts 27 may optionally be located exterior of panes 21.

Figure 5:
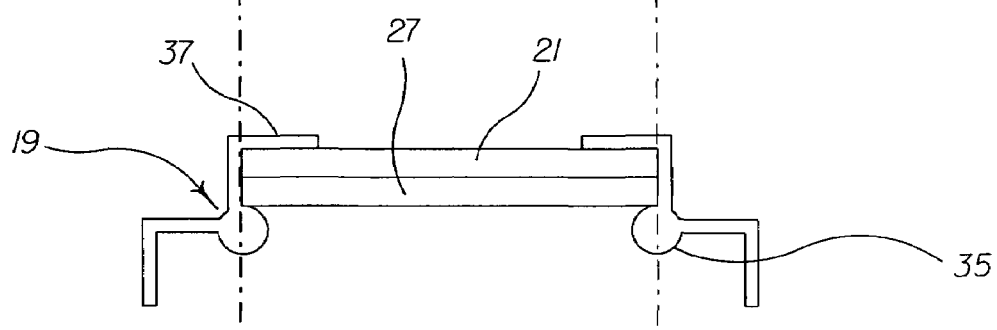
FIG. 5 is a plan view of a portion of the light of FIG. 1 and shows an alternate method of installation of inserts of the invention.

Alternatively, inserts 27 may be formed to be approximately the same width as panes 21, as shown in FIG. 5. In this type of configuration, inserts 27 fit between arms 37 and are generally adjacent panes 21, such that inserts 27 do not bow inward. Panes 21 and inserts 27 may be arranged with panes located exterior of inserts 27, as shown, or with panes located interior of inserts 27. In addition, inserts 27 may be retained by other means, such as clips, fasteners, or adhesives.

While panes 21 and inserts 27 are shown to be used simultaneously in the preferred embodiment, properly shaped and sized panes 21 and inserts 27 may be used without an accompanying pane 21 or insert 27. Finally, while the preferred embodiment shows the use of one pane 21 and one insert 27 between retainers 19, any combination of numbers of panes 21 and inserts 27 may be used.

Referring again to FIG. 2, a major advantage of the present invention is that light 11 allows the user to easily alter the decorative or functional nature of the product by removing and replacing inserts 27 and/or panes 21 with decoratively or functionally different products as discussed above. As illustrated by FIG. 2, a user may remove base 25 from posts 35 by removing fasteners 33, leaving panes 21 and inserts 27 between retainers 19. Panes 21 are removable by sliding them out from between retainers 19, and inserts 27 are removable by sliding them out from between retainers 19 or flexing inserts 27 to clear posts 35. Thus the user can easily remove and replace panes 21 and inserts 27 as desired.

Light 11 is easily assembled by the user first positioning panes 21 between retainers 19, then inserting inserts 27, then sliding threaded posts 35 through holes 32 in base 25 and attaching fasteners 33 to threaded posts 35 below base 25. While the fastening mechanism in the preferred embodiment implements wingnuts as fasteners 33 for engaging helical threads on the ends of posts 35, alternative embodiments could instead use clips, snaps, magnets, bending of retainers 19, or any other means of removably connecting retainers 19 to base 25. In the preferred embodiment, disassembly is achieved by unscrewing fasteners 33 from the threaded posts 35 at the end of retainers 19 and freeing base 25, thereby presenting panes 21 and inserts 27 for removal and replacement.

Figures 6A, 6B:
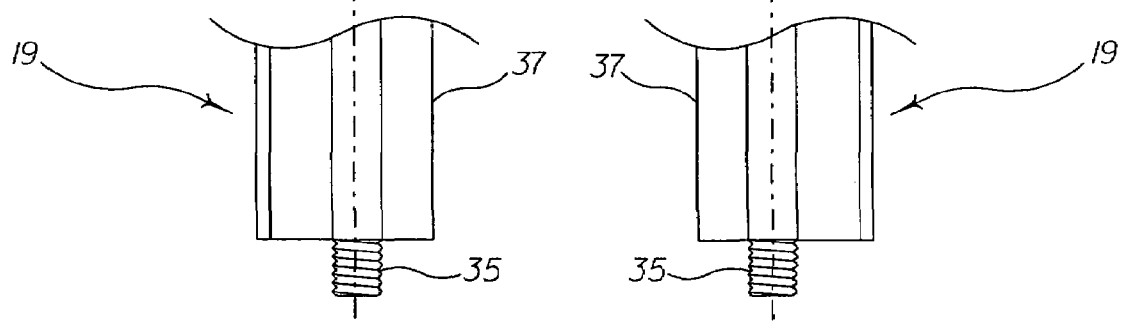
FIGS. 6A and 6B are side views of retainers of the light of FIG. 1, the retainers being oriented with respect to each other as assembled to retain panes and inserts within the light of FIG. 1.

Referring now to FIGS. 6A and 6B in the drawings, the preferred embodiment of retainer 19 according to the present invention is illustrated. FIGS. 6A and 6B offer a side view of retainers 19 and clearly show the threads on the end portions of posts 35 that fasteners 33 engage.

Figure 7:
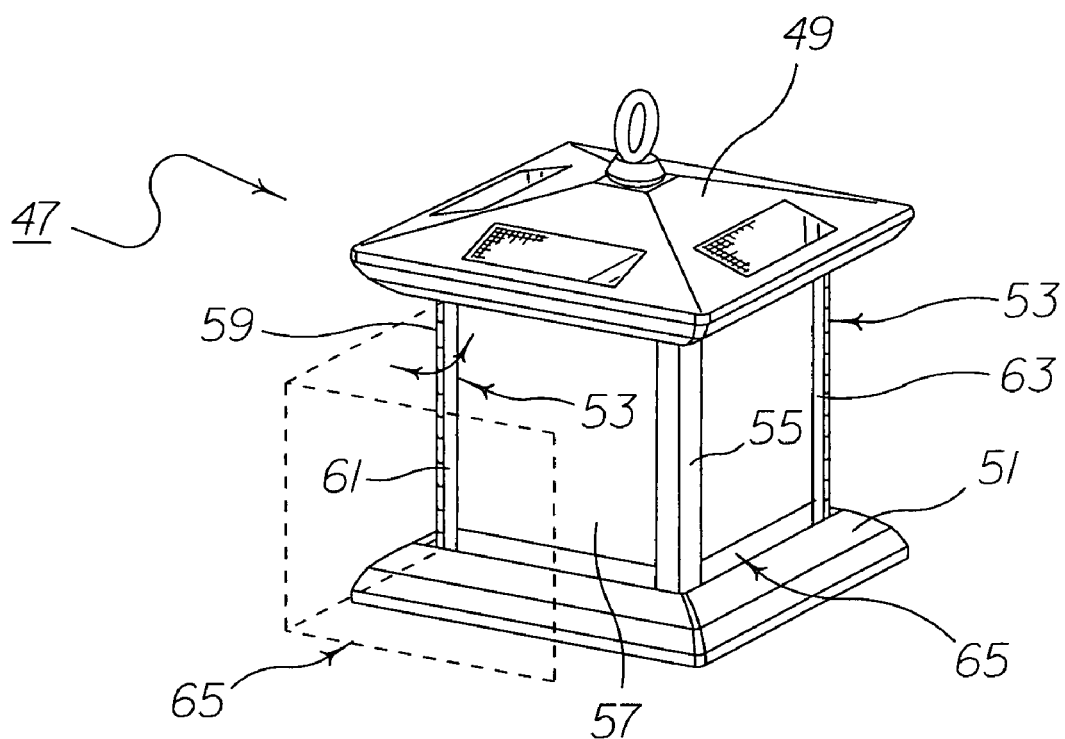
FIG. 7 is a perspective view of an alternate embodiment of the light of the invention.
Figure 8:
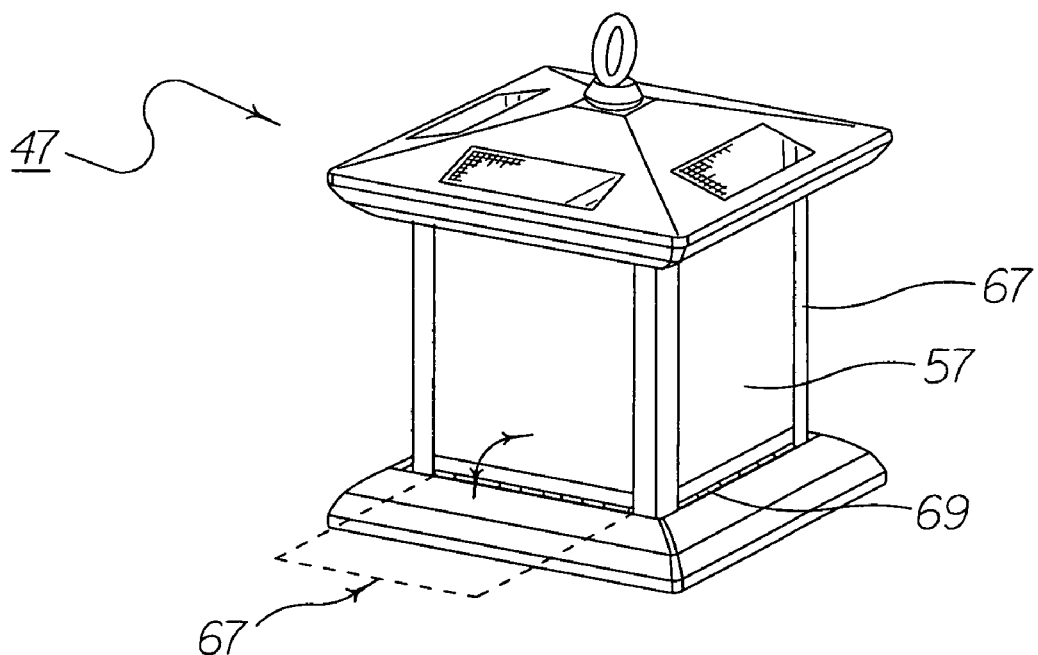
FIG. 8 is a perspective view of a second alternate embodiment of the light of the invention.

In some applications, lights of the type described herein may be mounted on a pole or similarly mounted, such that it is difficult or impractical to remove the base of the light to access the panes and inserts. FIGS. 7 and 8 show alternate embodiments of the light of the invention, in which hinges allow for access to the panes and the inserts without the need for disassembly. Referring to FIG. 7, in the preferred embodiment light 47 is constructed in a similar manner to light 11 of FIG. 1, with top 49 being connected to base 51 with a pair of opposing retainers 53. Retainers 53 cooperate with a second pair of opposing retainers 55 to retain panes 57 and inserts (not shown). Each retainer 53 has a vertical hinge 59 that bisects retainer 53 and allows for a movable portion 61 of retainer 53 to rotate outward from a closed position while fixed portion 63 of each retainer 53 rigidly connects top 49 to base 51. Movable portion 61 of each retainer 53 is rigidly connected to one of retainers 55, forming two opposing hinged frames 65 that each carries two panes 57. Light 47 can thus be opened by a user by rotating one or both frames 65 outward, providing access from the top or bottom of frame 65 for insertion or removal of panes 57 and/or their associated inserts. Through shown as being constructed to open in a "clamshell" configuration, light 47 may alternatively be constructed so that each pane 57 is individually movable on a vertical hinge, allowing access to panes 57 and the inserts.

Another optional configuration for light 47 is shown in FIG. 8, in which panes 57 are retained within frames 67, each frame 67 being outwardly rotatable about a horizontal hinge 69 located at the base of each frame 67. In this embodiment, a user can rotate each frame 67 outward, and then access panes 57 and inserts from the top of frame 67.

Figure 9:
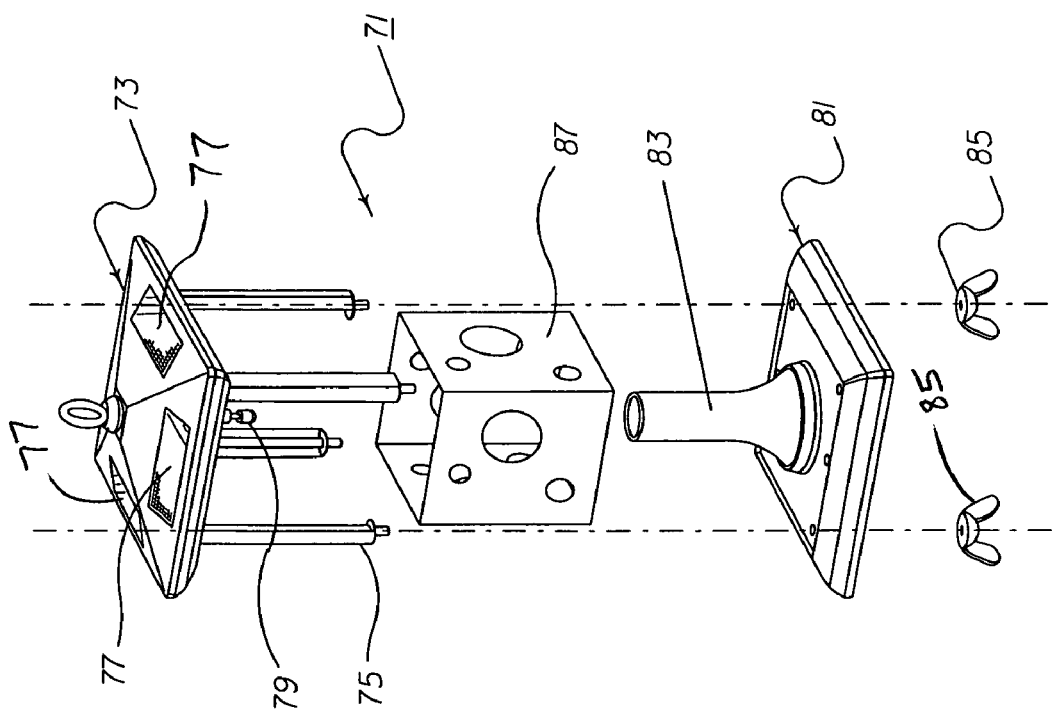
FIG. 9 is an exploded, perspective view of a third alternate embodiment of the light of the invention.

FIG. 9 is an exploded view of a third alternate embodiment of the light of the invention. Light 71 comprises a top 73 and legs 75 that depend from top 73. Optional solar panels 77 are preferably located on top 73 and provide electrical power for recharging an optional rechargeable electrical system (not shown) that is preferably carried within top 73. Alternatively, the electrical system may comprise replaceable batteries. A light source 79, which is preferably a LED, extends from a central portion of top 73 and is powered by the electrical system. A base 81 has a reflector 83 extending from base 81 for receiving light source 79, and base 81 is removably attached to legs 75 with fasteners 85. In this embodiment, a single-piece, replaceable insert 87 is installed within the area between legs 75 and surrounding reflector 83. Insert 87 is preferably formed from acetate films or other translucent materials, allowing light from light source 79 to pass through insert 87. Insert 97 may be formed to be multi-sided or generally cylindrical, or insert may be formed to be generally planar and then curled or folded into the desired shape prior to installation in light 71. This method of installation provides for use of Insert 87 without the requirement for use of translucent panes, such as those shown in embodiments described above, though panes may optionally be used.

Figure 10:
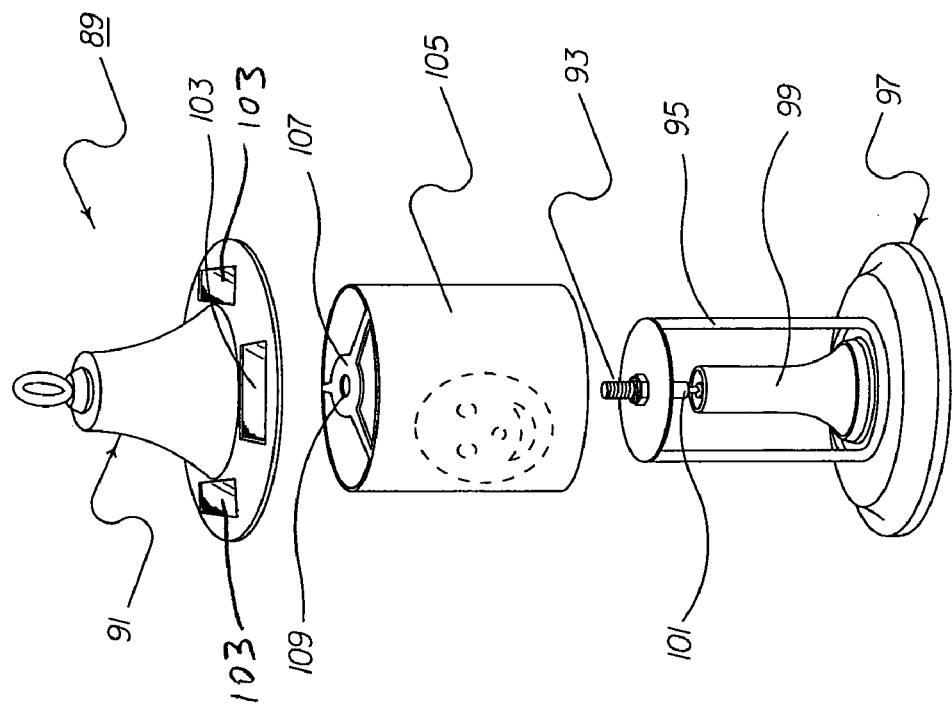
FIG. 10 is an exploded, perspective view of a fourth alternate embodiment of the light of the invention.

A fourth alternate embodiment of the invention is shown in FIG. 10, which shows light 89 in an exploded, perspective view. Light 89 has a top 91 that attaches to rod 93 extending from frame 95. Frame 95, which may optionally comprise translucent panes, extends from a base 97 and surrounds a reflector 99 that also extends from base 97. A light source 101, such as a LED, depends from an upper portion of frame 95 and extends into reflector 99. Optional solar cells 103 on top 91 provide electrical power for recharging an optional rechargeable electrical system (not shown) that is preferably carried within top 91. Alternatively, the electrical system may comprise replaceable batteries. In the embodiment shown, the electrical system is conductively connected to light source 101 through rod 93 when top 91 is attached to frame 95. This method of assembly allows for a replaceable insert 105 to be rotatably mounted on light 89, the insert being attached to a hub 107 having an aperture 109 sized for receiving rod 93. Insert 105 and hub 107 are free to rotate relative to light 89, such that wind force or other tangential forces cause rotation of insert 105. Though shown with a particular configuration, light 89 may be constructed to have alternate configurations, such as a configuration in which light 101 depends from top 91 and extends through aperture 109 of hub 107.

The present invention provides a light having several advantages, including 1) the ability to easily install, remove, or replace panes; 2) the ability to easily install, for variable speed control so as to allow a user to select a desired speed of insert 105 rotation.

The present invention provides a light having several advantages, including: (1) the ability to easily install, remove, or replace panes; (2) the ability to easily install, remove, or replace a decorative and/or functional inserts; and (3) the ability to install or replace panes and/or inserts without disassembly of the light.

While this invention has been described with reference to an illustrative embodiment, this description is not intended to be construed in a limiting sense. Various modifications and other embodiments of the invention will be apparent to persons skilled in the art upon reference to the description.

We claim:

1. A light assembly, comprising:
    at least one pane having at least one translucent portion;
    at least one insert having at least one translucent portion, the insert being operably associated with the at least one pane, wherein the at least one insert is flexible and is retained in a bowed configuration by the retaining means;
    a retaining means for retaining the at least one insert relative to the at least one pane; and
    at least one electrically powered light source for illuminating the at least one pane and the at least one insert.

2. The light assembly according to claim 1, further comprising:
    a rechargeable electrical power source for providing electrical power to the light source.

3. The light assembly according to claim 2, further comprising:
    a solar energy recharging system for at least partially recharging the rechargeable electrical power source.

4. The light assembly according to claim 1, wherein the electrically powered light source is adapted to direct light through the at least one pane and the at least one insert.

5. The light assembly according to claim 1, wherein the at least one insert has a translucent graphic that includes text.

6. The light assembly according to claim 1, wherein the at least one insert is formed to have a pattern of ridges.

7. The light assembly according to claim 1, wherein the translucent portion of the at least one insert comprises perforations therethrough.

8. The light assembly according to claim 1, wherein the at least one pane is configured to selectively allow access to the at least one insert.

9. A light assembly, comprising:
    a frame;
    at least one pane operably associated with the frame, wherein the at least one pane is hingedly connected to the frame;

at least one insert operably associated with the at least one pane; and at least one electrically powered lighting element for illuminating the at least one pane and the at least one insert.

10. The light assembly according to claim 9, further comprising:

a base removably connected to the frame for allowing access to the at least one insert.

11. The light assembly according to claim 9, further comprising:

a rechargeable electrical power source for providing electrical power to the lighting element.

12. The light assembly according to claim 11, further comprising:

a solar energy recharging system for at least partially recharging the rechargeable electrical power source.

13. The light assembly according to claim 9, wherein the at least one lighting element is adapted to direct light through the at least one pane and the at least one insert.

14. A light assembly, comprising:

an insert support member;

at least one insert carried by the insert support member, the insert being freely rotatable relative to the insert support member;

at least one electrically powered light source for illuminating the at least one insert; and a rechargeable electrical power source for providing electrical power to the at least one light source.

15. The light assembly according to claim 14, further comprising:

a solar energy recharging system adapted to at least partially recharge the rechargeable electrical power source.

16. The light assembly according to claim 14, wherein the light source is adapted to direct light through the at least one insert.

* * * * *